United States Patent
Handt et al.

(10) Patent No.: US 11,942,811 B2
(45) Date of Patent: Mar. 26, 2024

(54) METHOD FOR PRECHARGING A NETWORK SECTION

(71) Applicant: Siemens Aktiengesellschaft, Munich (DE)

(72) Inventors: Karsten Handt, Berg (DE); Hubert Schierling, Erlangen (DE)

(73) Assignee: Siemens Aktiengesellschaft, Munich (DE)

(*) Notice: Subject to any disclaimer, the term of this patent is extended or adjusted under 35 U.S.C. 154(b) by 285 days.

(21) Appl. No.: 17/426,225

(22) PCT Filed: Jun. 3, 2019

(86) PCT No.: PCT/EP2019/064312
§ 371 (c)(1),
(2) Date: Jul. 28, 2021

(87) PCT Pub. No.: WO2020/156689
PCT Pub. Date: Aug. 6, 2020

(65) Prior Publication Data
US 2022/0094188 A1  Mar. 24, 2022

(30) Foreign Application Priority Data

Jan. 31, 2019 (EP) ..................... 19154722

(51) Int. Cl.
*H02J 7/00* (2006.01)
*H02J 1/06* (2006.01)

(52) U.S. Cl.
CPC .............. *H02J 7/0068* (2013.01); *H02J 1/06* (2013.01)

(58) Field of Classification Search
CPC ................. H02J 7/0068; H02J 1/06
See application file for complete search history.

(56) References Cited

U.S. PATENT DOCUMENTS

| 2015/0061376 | A1 | 3/2015 | Hartl et al. |
| 2017/0229872 | A1* | 8/2017 | Ghotra ............... H02J 3/381 |
| 2020/0099249 | A1 | 3/2020 | Schierling et al. |

FOREIGN PATENT DOCUMENTS

EP  3379675 A1  9/2018

OTHER PUBLICATIONS

PCT International Search dated Jul. 18, 2019 corresponding to PCT International Application No. PCT/EP2019/064312 filed Jun. 3, 2019.

(Continued)

*Primary Examiner* — Carlos Amaya
(74) *Attorney, Agent, or Firm* — Harness, Dickey & Pierce, P.L.C.

(57) ABSTRACT

A method is for precharging a second network section with electrical energy from a first network section of a DC network. In an initial state, an initial voltage prevailing in the second network section is lower than a DC voltage prevailing in the first network section. At a first point in time, the two network sections are connected via a resistor current path having a precharging resistor. At a subsequent second point in time, as soon as the voltage in the second network section is between the initial voltage and the DC voltage, the two network sections are connected via a semiconductor switch which is situated parallel to the resistor current path and is operated in a clocked mode or in a linear mode as a controllable resistor.

15 Claims, 9 Drawing Sheets

(56) References Cited

OTHER PUBLICATIONS

Written Opinion of International Searching Authority dated Jul. 18, 2019 corresponding to PCT International Application No. PCT/EP2019/064312 filed Jun. 3, 2019.

* cited by examiner

METHOD FOR PRECHARGING A NETWORK SECTION

PRIORITY STATEMENT

This application is the national phase under 35 U.S.C. § 371 of PCT International Application No. PCT/EP2019/064312 which has an International filing date of Jun. 3, 2019, which claims priority to European application No. EP19154722.3 filed Jan. 31, 2019, the entire contents of each of which are hereby incorporated herein by reference.

FIELD

Embodiments of the present application generally relate to a method for precharging a network section of a DC network, and to a computer program product with which the method can be carried out. The invention also relates to a corresponding switching device and to a DC network with such a switching device.

BACKGROUND

A distribution of energy within an industrial plant or a building by way of direct current is not only advantageous due to an easy exchange of energy between devices and/or an easy connection to, for example, regenerative energy sources. The simple and high modularity of a DC network (DC=direct current) has also been found to be advantageous, particularly in today's continuously changing industry.

DC networks typically comprise multiple network sections that can be designed for example as energy sources, energy stores or loads, i.e. as electrical consumers. The network sections here are connected to one another via switching devices so that they can be electrically disconnected. The switching device usually comprises electronic and/or mechanical switches for disconnecting the network sections. A DC network usually also comprises a connection to a three-phase network that forms an external energy source of the DC network. The three-phase current is rectified here with the aid of a rectifier, and supplied to the DC network via a feed unit.

The largest consumers in an industrial DC network are usually AC-fed electrical drives (AC=alternating current). Due to the storage capacitors that are arranged in the inverters that are necessarily installed upstream of the AC electrical drives for stabilizing and buffering the DC voltage, these electrical drives form primarily capacitive loads. When these capacitive loads are connected to the DC network, an equalization current flows through the switching device between a first network section of the DC network functioning as a central supply network and the capacitive loads arranged in a second network section of the DC network, which equalization current can reach very high amplitudes—therefore also known as the switch-on surge—and can thus lead to thermal damage of electronic components and to unacceptable repercussions on the supplying network. Electrotechnically, this equalization current can be managed by various measures—all of them, however, are based on the principle of limiting the maximum value of the equalization current.

The simplest option for limiting the equalization current, also referred to below as the precharging current, during a precharging process consists of passing the equalization current between the two network sections through a precharging resistor. The precharging resistor is only needed when the capacitive load is switched on at the supply network; its purpose is to limit the precharging current with which the capacitive load is charged from the supply network. As soon as the capacitive load is charged, the current limitation can be ended; for this purpose, the precharging resistor can, for example, be bridged by way of a bridging contact. The switching-on of a precharging resistor is, however, associated with the disadvantage that a voltage difference is always retained between the two network sections if the load is already drawing power during the precharging phase, for example due to the leakage currents of the capacitors, due to the current through balancing resistors, but also due to auxiliary power supplies that start up immediately after what may be a relatively low voltage value is reached.

A second option for limiting the equalization current during a precharging process is the use of a step-down converter in the load current path. A step-down converter choke is needed in this case. Instead of providing the step-down converter choke as a separate component, which is undesirable due to the additional costs, the space requirement and the energy losses, the inductance of the power lines can alternatively be used. This, however, requires a high clock frequency, which leads to greater switching losses at the transistor, and/or it results in a high current ripple; the maximum current of the current ripple can here be significantly greater than the rated current of the step-down converter. This means that the step-down converter must be designed for the maximum current of the current ripple, which means that it altogether has to have a current-carrying capacity several times greater than is actually needed for the step-down converter.

SUMMARY

At least one embodiment of the invention provides an improved method for precharging.

BRIEF DESCRIPTION OF THE DRAWINGS

The properties, features and advantages of this invention, described above, as well as the manner in which these are achieved, will become clearer and more clearly understood in connection with the following description of the example embodiments, which are explained in more detail in association with the drawings, in which, schematically.

DETAILED DESCRIPTION OF THE EXAMPLE EMBODIMENTS

Figure 1:
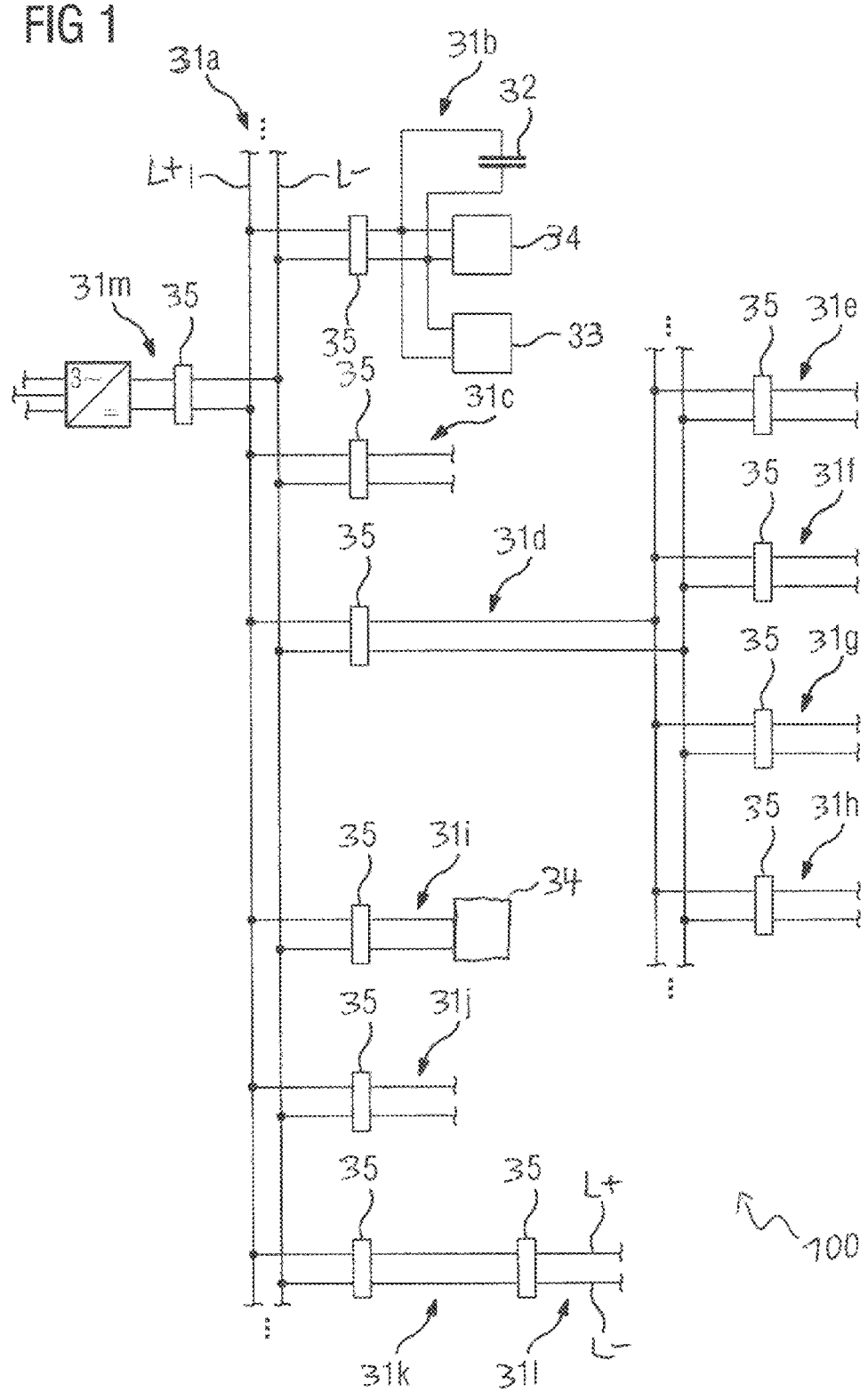
FIG. 1 shows a DC network with a plurality of network sections.

At least one embodiment of the invention is directed to a method. This involves a method for precharging a second network section with electrical energy from a first network section of a DC network. An initial voltage prevailing in the second network section is here, in an initial state, lower than a DC voltage prevailing in the first network section. At a first point in time, the two network sections are connected together in an electrically conductive manner via a resistance current path comprising a precharging resistor. At a subsequent second point in time, as soon as the voltage in the second network section lies between the initial voltage and the DC voltage, the two network sections are connected together in an electrically conductive manner via a semiconductor switch arranged parallel to the resistance current path. The semiconductor switch is operated here in a clocked mode or in a linear range as a controllable resistor. Operation in the linear range requires less effort in terms of a protective circuit. However, when operating in the linear range, power is lost in the power semiconductor, which is in this case operating as a variable resistor. In addition, the circuit complexity for operation of the semiconductor switch in a linear range is greater than for operation of the semiconductor switch in the clocked mode.

If the two network sections are connected electrically via the semiconductor switch arranged parallel to the resistance current path, the two network sections can moreover remain connected in an electrically conductive manner via the resistance current path.

At least one embodiment of the invention is directed to a switching device. This involves a switching device for precharging a second network section with electrical energy from a first network section of a DC network. The switching device comprises a resistance current path comprising a precharging resistor. The switching device comprises a semiconductor switch that is arranged parallel to the resistance current path and designed to connect the two network sections electrically and that comprises at least one power semiconductor. The power semiconductor can be operated here in a clocked mode or in a mode in the linear range as a controllable resistor. The switching device also comprises a control unit for controlling the power semiconductor.

The semiconductor switch that is arranged parallel to the resistance current path comprises at least one power semiconductor that can be operated in a clocked mode or in a mode in the linear range as a controllable resistor. All power semiconductor that can be switched off may be considered here, such as for example IGBTs (insulated gate bipolar transistors), MOSFETs (metal-oxide-semiconductor field-effect transistors), GTOs (gate turn-off thyristors) and so forth.

In at least one embodiment, a change is made between different current limitation methods during the period of the voltage equalization between the two network sections, wherein the most suitable current limitation method is chosen depending on the voltage difference currently prevailing. In this way, the disadvantages with which the respective precharging possibilities are associated are largely circumvented.

In a first time section of the method according to an embodiment of the invention, the precharging takes place via the precharging resistor: due to the fact that at the beginning of this first time section, the voltage driving the equalization current is still relatively high, the equalization current flowing between the two network sections is also relatively high; effective precharging can thus take place at first. Due to the equalization current continuing to flow through the precharging resistor, the voltage level in the second network section continues to tend towards the voltage level in the first network section, and the voltage driving the equalization current falls significantly as time goes by; a phase is reached in which the precharging resistor is relatively large in comparison with the reduced driving voltage, so that the equalization current is significantly smaller than at the beginning of the first time section. If it were desired to wait in this constellation for the full precharging of the second network section it could take an unacceptably long time, or even never be achieved since, as already explained in the introduction, a voltage difference always remains between the two network sections if the load is already drawing power during the precharging phase, for example due to the leakage currents of the capacitors, due to the current through balancing resistors, or else due to auxiliary power supplies that start up immediately after what may be a relatively low voltage value is reached.

At this point, a second time section, following the first time section, of the method according to an embodiment of the invention starts in which the precharging takes place through a semiconductor switch, arranged parallel to the resistance current path and operated in clocked fashion or in a linear range.

When operating in the clocked mode the semiconductor switch acts as a switching mode DC voltage converter in which the output voltage is smaller than the magnitude of the input voltage. The semiconductor switch is switched on and off regularly by a controller; usually a few hundred up to several million switching cycles are performed each second. Electrical energy is thereby transferred from the first network section to the second network section. Because of the driving voltage between the two connected network sections at the beginning of the second time section, which voltage is significantly reduced in comparison with the voltage present at the beginning of the first time section, the current rise is lower than it would have been under the voltage present at the beginning of the first time section; as a result, clock frequency and/or current ripple remain relatively small. As a consequence, the maximum current of the current ripple remains at a level that lies within the safe working region of the semiconductor switch.

The semiconductor switch operated in the linear range, also referred to as the active region, acts as a controllable resistor that limits the equalization current. Because of the driving voltage between the two connected network sections at the beginning of the second time section, which voltage is significantly reduced in comparison with the voltage present at the beginning of the first time section, the equalization current and the corresponding thermal power loss are significantly smaller than they would have been under the voltage present at the beginning of the first time section. The semiconductor switch is consequently not thermally overloaded; an over-dimensioning of the semiconductor switch ensuring safety in this respect can thus be omitted.

An embodiment of the present invention thus makes it possible to achieve complete precharging without additional components. In the precharging phase via the precharging resistor, the high voltage difference between the two connected network sections that is initially present is exploited. In the precharging phase via the semiconductor switch, on the other hand, a high voltage difference which prevails in the precharging phase via the precharging resistor is unwanted: the lower voltage difference between the two connected network sections now prevailing is used instead.

After passing through the two time sections of the method according to the invention described above, no voltage difference, or no significant voltage difference, exists any longer between the two connected network sections. In this case, the precharging can be regarded as complete in order to change over to normal operation. In normal operation the two network sections are preferably connected to one another via the semiconductor switch.

The transfer between operation of the semiconductor switch in the clocked mode or in the linear range and the subsequent normal operation in which the two network sections lie practically at the same voltage level is smooth here: It is possible to regulate the clocking in the clocked mode with respect to a peak current value of the equalization current that at some time will no longer be reached, and the semiconductor switch thus simply remains switched on; it is alternatively possible to regulate the active range with respect to a current that is to flow, so that the set resistance value becomes smaller and smaller until finally it reaches the minimum value meaning that the switch remains switched on.

An embodiment of the present invention implements a protection concept for plant operation in order to avoid a damaging equalization current, wherein the protection concept can be adapted variably to the plant configuration.

According to a preferred configuration of an embodiment of the invention, the two network sections are connected via the semiconductor switch as soon as the voltage in the second network section is between 60 and 90 percent of the DC voltage. This voltage range is the optimum range to open the semiconductor switch, since the best compromise is achieved there between an increasing delay with further precharging via the precharging resistor, and a greater power loss or risk of damage through high currents in the event of precharging via the semiconductor switch starting earlier.

According to a preferred configuration of an embodiment of the invention, the two network sections are connected via the semiconductor switch as soon as an equalization current flowing via the resistance current path is smaller than a predefined threshold value. The threshold value can be selected here in such a way that the best compromise is achieved for the specified network section constellation between an increasing delay with further precharging via the precharging resistor, and a greater power loss or risk of damage through high currents in the event of precharging via the semiconductor switch starting earlier.

According to a preferred configuration of an embodiment of the invention, the resistance current path comprises a switch in series with the precharging resistor, wherein the control unit is designed to control the switch. The resistance current path through the precharging resistor can be opened and closed with the switch.

According to a preferred configuration of an embodiment of the invention, the switch arranged in the resistance current path comprises at least one power semiconductor. This switch can be designed as a switchable semiconductor, for example a transistor, an IGBT, a MOSFET or the like. It is also possible for the switch to be designed in the form of two anti-serially connected switchable semiconductors, possibly each having a diode connected antiparallel with the switchable semiconductor. If a mechanical switch is to switch the precharging resistor on and off, the mechanical switch must have a DC-switching capacity; this is, however, often difficult to realize with mechanical switches. A switchable power semiconductor has a DC-switching capacity and, moreover, a power semiconductor can switch significantly faster than a mechanical switch.

At least one embodiment of the invention is directed to a computer program product. The computer program product is designed to be able to be carried out in at least one control unit. The computer program product can be designed as software, for example as an app that can be downloaded from the Internet, or as firmware that can be stored in a memory and can be carried out by a processor or a computing device. Alternatively or in addition, the computer program product can also be designed at least partially as a hard-wired circuit, for example as an ASIC (application-specific integrated circuit).

The computer program product according to an embodiment of the invention is designed to carry out the method described above according to an embodiment of the invention. The computer program product is also designed to carry out an embodiment of the method for precharging a network section.

It is in particular designed to carry out the step of connecting, at a first point in time, the two network sections via a resistance current path comprising a precharging resistor. It is, in addition, designed to carry out the step of connecting the two network sections via a semiconductor switch that is arranged parallel to the resistance current path and operated in a clocked mode or in a mode in the linear range as a controllable resistor at a subsequent second point in time as soon as the voltage in the second network section lies between the initial voltage and the DC voltage. According to the invention, the computer program product is designed to implement and carry out at least one embodiment of the method outlined for precharging a network section. The computer program product according to the invention can be designed here to carry out the method for precharging a network section, the computer program product being designed to be executable in a control unit of the switching device. The computer program product can here be designed to combine all of the partial functions of the method in itself, i.e. monolithically. The computer program product can alternatively also be of segmented design and distribute partial functions in each case to segments which are executed on separate hardware. The computer program product can thus be designed to be able to be carried out partially in a control unit of the first network section and partially in a control unit of the second network section. In addition, part of the method can be carried out in a control unit and another part of the method in an instance on a higher level than the control unit such as, for example, a PLC, a manual parameterization device or a computer cloud.

At least one embodiment of the invention is directed to a DC network with a first network section and a second network section, wherein, in an initial state, an initial voltage prevailing in the second network section is lower than a DC voltage prevailing in the first network section. The DC network here comprises a switching device according to an embodiment of the invention arranged between the first network section and the second network section, as is described above.

According to a preferred embodiment of the DC network according to the invention, the two network sections each comprise a first conductor and a second conductor between which the voltage of the respective network section is present, wherein the two network sections are permanently connected to one another via the second conductors and can be connected to one another and disconnected from one another via the first conductors by way of a switching device.

Embodiments of the present invention have—speaking generally—electrotechnical subject matter. Terms such as "connected" and "disconnected" or "insulated" and the like are therefore always intended in the electrical sense rather than in the mechanical sense.

FIG. 1 shows a DC network 100 with a plurality of network sections 31. The network sections 31 are supplemented in the illustration of FIG. 1 additionally with an individual lower case letter. When reference is made below to an entirely specific one of the network sections 31 illustrated in FIG. 1, the reference sign, supplemented with the corresponding lower case letter, is used, i.e., for example, the reference sign 31c or the reference sign 31f. If, on the other hand, reference is simply made generally to the network sections 31, only the reference sign 31, without being supplemented by a lower case letter, is used.

As a rule, the DC network comprises a central network section, referred to for short as the central section. In the illustration of FIG. 1, this is the network section 31a. The central section 31a represents the "hub" for the other network sections 31. The central section 31a is thus common to the other network sections 31.

As can be seen from FIG. 1, the network sections 31 can form branches similar to a tree structure. The network section 31d, for example, is itself divided into further network sections 31e to 31h. It is also possible for a plurality of network sections 31 to be connected one after another. In the illustration of FIG. 1, these are the network sections 31k and 31l. The "network section" 31m represents the connection of the central section 31a to an AC network—a three-phase network in this case.

The nature of the network sections 31 per se can be determined as required, for example as a load zone, a robot cell or a consumer branch. As a rule, however, they comprise in each case an electrical energy store 32. The energy store 32 can, for example, be a battery or a capacitor. In most cases the network sections 31 further comprise at least one energy source 33 and/or at least one consumer 34. A photovoltaic plant or a (charged) battery is an example of an energy source 33. An electric motor, a heating appliance and an (uncharged) battery are examples of consumers 34. Other energy sources 33 and other consumers 34 can, however, also be present. Combinations are also possible. For reasons of clarity, the energy store 32, the energy source 33 and the consumer 34 are only drawn for one of the network sections 31 in FIG. 1. The corresponding units 32, 33 and 34 can, however, also be present in the other network sections 31.

The DC network comprises a switching device 35 for each of the network sections 31. Depending on how the switching device 35 is driven, the respective network section 31 can be connected to at least one other network section 31 or disconnected from the at least one other network section 31 by way of the respective switching device 35. As a result of this, the network sections 31b to 31l can be connected to or disconnected from the central section 1a directly or indirectly via other network sections 31. A switching process, for example, i.e. a change between two different switch states, of the switching device 35 of the network section 31f brings about the connection or the disconnection of the network section 31f to or from the network section 31d. Depending on the switch state of the switching device 35 for the network section 31d, the network section 31f is thus connected via the network section 31d to the central section 31a or is disconnected from it or is only connected to or disconnected from the network section 31d without there being a further connection to the central section 31a.

As a result of the configuration as a DC network, the network sections 31 have a first, positive potential $\Phi 1$ in a first electrical conductor L+ and a second, negative potential $\Phi 2$ in a second electrical conductor L−. For reasons of clarity, the reference signs L+, L− of the conductors are only drawn for the network sections 1a and if in FIG. 1. Two conductors of the network sections 31, that are at an equal or almost equal potential $\Phi$, can be connected to one another via the switching devices 35, i.e., for example, a first electrical conductor L+, that is at a positive potential $\Phi 1$, of one of the network sections 31 to first electrical conductors L+, that are at a positive potential $\Phi 1$, of the other network sections 31 and, similarly, a second electrical conductor L−, that is at a negative potential $\Phi 2$, of one of the network sections 31 to second electrical conductors L−, that are at a negative potential $\Phi 2$, of the other network sections 31. A "crosswise" connection, i.e. for example, of the first conductor L+ of the central section 31a to the second conductor L− of one of the other network sections 31, is, on the other hand, not permissible.

In the simplest case, a switching device 35 is designed in such a way that, depending on the switch state, it only disconnects or connects a first conductor L+, that is at a first, positive potential $\Phi 1$, of a first network section 31 from or to a first conductor L+, that is at the first, positive potential $\Phi 1$, of the other network sections 31. The second conductors L−, that are at the negative potential $\Phi 2$, of the network sections 31, on the other hand, are permanently connected to one another. Thus in this case it may be that only a single-pole disconnection of the respective network section 31 from the other network sections 31 occurs. Only one (1) switching path is thus present. Without restricting the generality, it can always be assumed here that the positive potential $\Phi 1$ is the switched potential, while the negative potential $\Phi 2$ is not switched. The inverse procedure is, however, also in principle possible.

It is also, however, possible that a two-pole disconnection of the respective network section 31 from the other network sections 31 takes place with the aid of two switches, i.e. one switch per conductor. Preferably a first switch disconnects or connects a first conductor L+, that is at a first potential $\Phi 1$, of a first network section 31 from or to a first conductor L+, that is at the first potential $\Phi 1$, of the other network sections 31, and a second switch disconnects or connects a second conductor L−, that is at a second potential $\Phi 2$, of a first network section 31 from or to a second conductor L−, that is at the second potential $\Phi 2$, of the other network sections 31.

For as long as the network sections 31 are connected to one another, the positive potentials $\Phi 1$ are equal to one another, and the negative potentials $\Phi 2$ are also equal to one another. The potential difference U between the positive potentials $\Phi 1$ and negative potentials $\Phi 2$, i.e. the electrical voltage present between the conductors L+, L−, is thus also the same for the network sections 31. If possible, the voltage U should be equal to a rated value. The rated value can be chosen as required; it can, for example, be 24 V, 380 V, 760 V or another suitable value. When the network sections 31 are disconnected from one another, then in the case of the single-pole disconnection, the negative potential $\Phi 2$ is still the same for the network sections 31. In this case, on the other hand, the positive potential $\Phi 1$ can have individual values for the network sections 31 or, potentially, groups of network sections 31. This also additionally applies to the negative potential $\Phi 2$ in the case of two-pole disconnection. In both cases—that is both in the case of single-pole disconnection as well as in the case of two-pole disconnection—the voltage U can however individually have its own value for each of the respective network sections 31 or respective group of network sections 31.

If the voltage U1 of a first network section 31 differs from the voltage U2 of another network section 31, i.e. if U1≠U2, the corresponding network sections 31 cannot simply be electrically connected, since the current triggered by the voltage difference ΔU between the conductors L that are at different potentials Φcan be so high that electrical components, in particular power semiconductors, can be damaged. It is true that such a current only flows when capacitive loads are connected; that is, however, normal in industrial networks, since intermediate converter circuits are coupled together there. To equalize voltage differences ΔU=U1−U2 of this type between the conductors L that are to be connected before the connection, the switching devices 35 each have a precharging resistor 6 (shown in FIG. 4).

Figure 2:
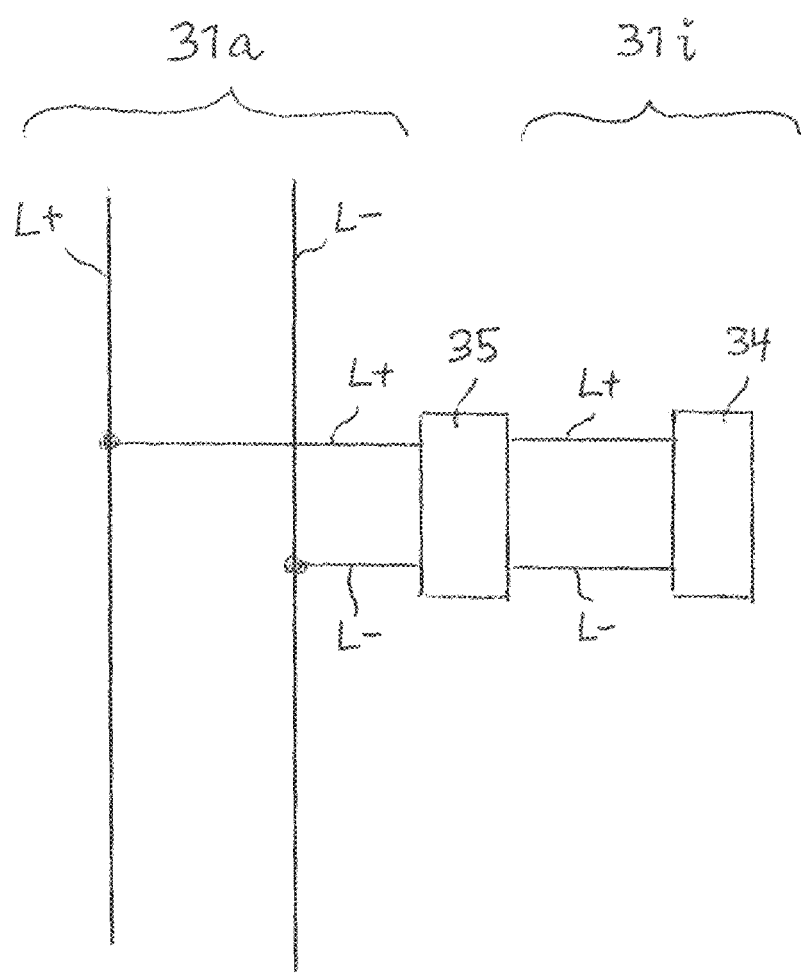
FIG. 2 shows a central network section and a network section with a consumer, as well as a switching device connected between the network sections.

FIG. 2 shows an enlarged view of the connection illustrated in FIG. 1 between the central network section 31a and the network section 31i in which an electrical consumer 34 is connected, referred to for short as the consumer network section 31i, by way of a switching device 35 connected between the two network sections 31a, 31i. The switching device 35 here connects the conductor L+, that is at a positive potential, of the central network section 31a to the corresponding conductor L+ of the consumer network section 31i, and the conductor L−, that is at a negative potential, of the central network section 31a to the corresponding conductor L− of the consumer network section 31i.

Figure 3:
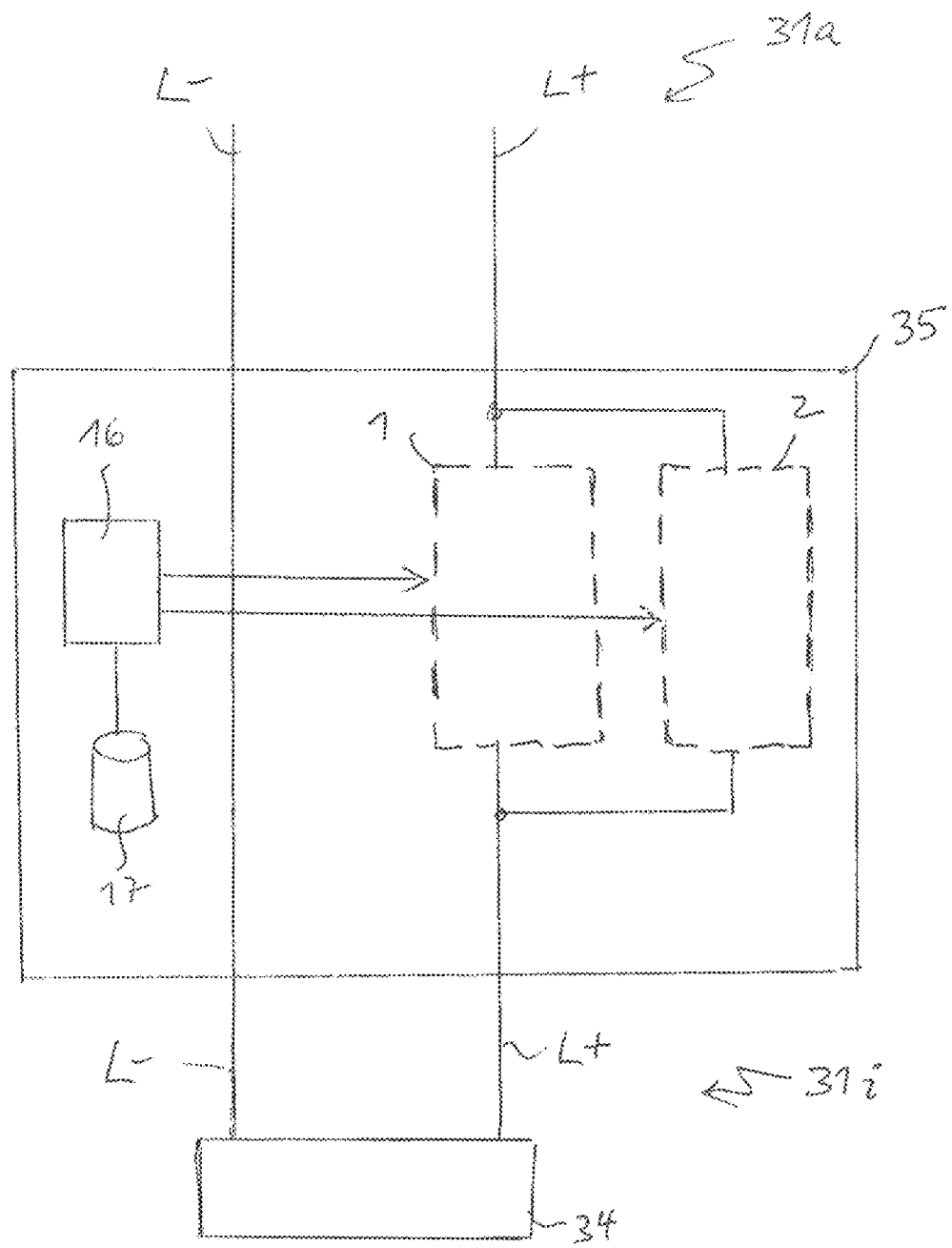
FIG. 3 shows a schematic illustration of a switching device.

FIG. 3 shows a further enlarged illustration of the switching device 35 shown in FIG. 2, with which the consumer network section 31i with the electrical consumer 34 can be electrically connected to or disconnected from the central network section 31a. For this purpose, the switching device 35 enables a single-pole disconnection of the network section 31i from the central network section 31a, wherein the switching device 35 performs a disconnection of the conductors L+, that are at a positive potential, of the network sections 31a, 31i, while leaving the conductors L−, that are at a negative potential, of the network sections 31a, 31i always connected.

The switching device 35 comprises a semiconductor switch 1 with which the positive conductors L+ can be disconnected and connected. To this end, the semiconductor switch 1 comprises at least one power semiconductor that can be operated in a clocked mode or in a mode in the linear range as a controllable resistor. The switching device 35 comprises a resistance current path 2 for connection in parallel with the semiconductor switch 1, in which current path the equalizing current is passed through a precharging resistor.

The semiconductor switch 1 and the resistance current path 2 can be controlled by a control unit 16 that is connected to a data memory 17. A computer program product is stored in the data memory, which computer program product, when carried out by the control unit 16, executes the steps of the method according to an embodiment of the invention.

Figure 4:
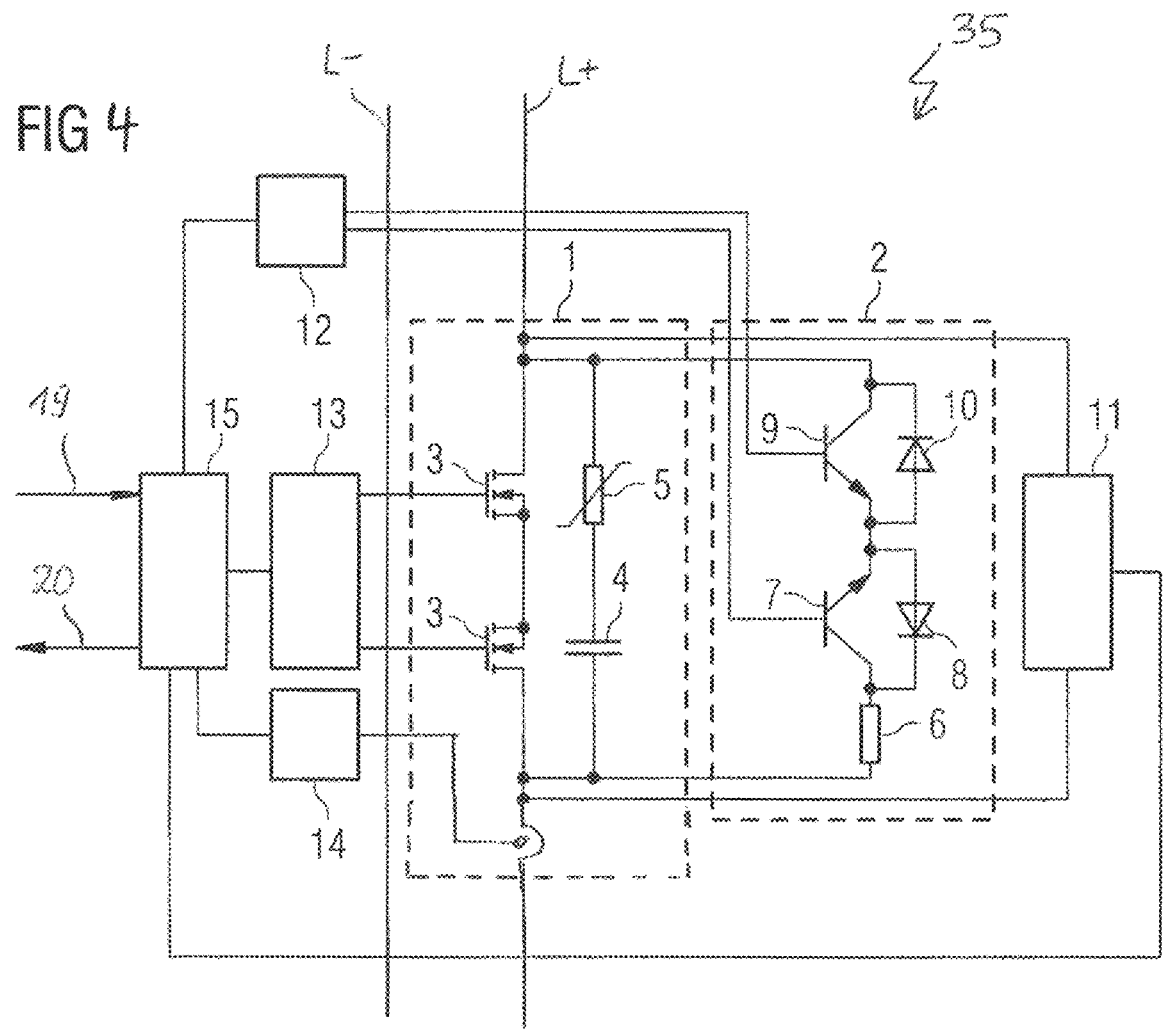
FIG. 4 shows a first example embodiment of a switching device.

FIG. 4 shows a first example embodiment of the switching device. The resistance current path 2 comprises two IGBTs 7 and 9 connected anti-serially, referred to below for the sake of simplicity simply as transistors, each with a diode 8, 10 connected antiparallel with the transistor 7 and 9, and a precharging resistor 6 connected in series with the transistors. The transistors 7, 9 are controlled by a first control unit 12, i.e. switched to be conductive or blocking: this is done by changing the gate-emitter voltage at the respective transistor 7, 9. In a first current direction, the current path thus runs through a first transistor 9, switched to be conductive, the diode 8 that is connected antiparallel with the second transistor 7 that is switched to be blocking, and the precharging resistor 6. In a second current direction opposite to the first current direction, the current path thus runs through the precharging resistor 6, the second transistor 7 that is switched to be conductive, and the diode 10 that is connected antiparallel with the first transistor 9, which is switched to be blocking.

The current path through the semiconductor switch 1 passes through two switchable power semiconductors 3 that are connected in series and designed as normally blocking, n-channel MOSFETs connected anti-serially. The MOSFETs 3 are controlled, i.e. switched to be conductive or blocking, by a second control unit 13: the drive of the MOSFETs 3 is achieved by a control voltage (gate-source voltage), or a control potential (gate potential), the flow of current from drain to source can be influenced therewith. MOSFETs have an intrinsic inverse diode, for which reason a diode connected antiparallel with the MOSFETs 3, as is necessary with the IGBT in the resistance current path 2, can be omitted. A snubber element 4, 5, formed by a series circuit of a capacitor 4 with a resistor 5, in this case: a variable resistor that is also referred to as a varistor, is connected in parallel with the two MOSFETs 3. The capacitor 4 and the resistor 5 are dimensioned here appropriately for the voltage and for the current. The snubber element 4, 5 limits an overvoltage when the MOSFETs 3 are switched off.

FIG. 4 also shows a voltage acquisition device 11 for measuring the electrical voltage dropping across the switching device 35, a current acquisition device 14 for measuring the electrical current flowing through the switching device 35, and a signal processing device 15 that receives measurement signals from the voltage and current acquisition devices 11, 14, evaluates them, and outputs signals to the two control units 12, 13. The signal processing device 15 can receive signals 19 from the outside, e.g. from an operator of the switching device, for switching on and off as well as transmit status signals 20 to the outside, e.g. to an operator of the switching device. Both the current flowing through the resistance current path 2 and the current flowing through the semiconductor switch 1 can be measured by the current acquisition device 14.

Figure 5:
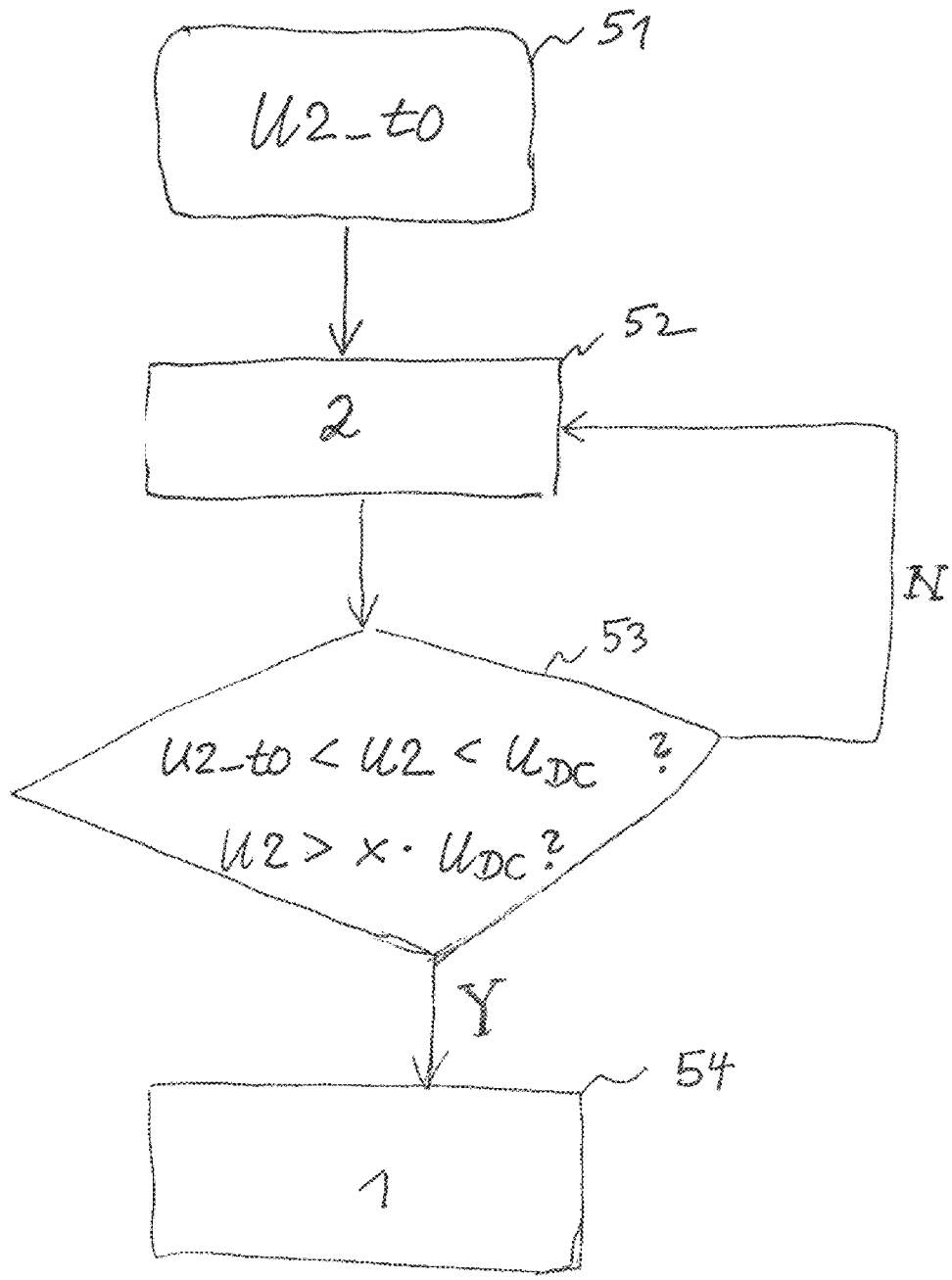
FIG. 5 shows a flow diagram of the method of an example embodiment.

FIG. 5 shows a flow diagram of a method according to an embodiment of the invention for limiting an equalization current between the two network sections 31a, 31i, wherein, in an initial state 51, an initial voltage U2_t0 prevailing in the second network section is smaller than a DC voltage UDC prevailing in the first network section. In a first step 52, the two network sections 31a, 31i are electrically connected via the resistance current path 2 which comprises a precharging resistor. The equalization current flowing through this electrical connection, whose magnitude is limited by the precharging resistor, flows in a direction such that the potential difference between the two network sections 31a, 31i becomes more balanced, in other words: the equalization current continuously reduces the voltage difference between the two network sections 31a, 31i. In a query step 53, a query is regularly made as to whether the voltage U2 in the second network section 31i is between the initial voltage U2_t0 and the DC voltage UDC, and whether the voltage value U2 in the second network section 31i exceeds a specified percentage of the DC voltage UDC: as long as the voltage value U2 in the second network section 31i does not exceed a specific percentage of the DC voltage UDC (arrow "N"), the semiconductor switch 1 remains closed. Only when the voltage value U2 in the second network section 31i exceeds a specific percentage of the DC voltage UDC (arrow "Y") is the semiconductor switch 1 opened, wherein the power semiconductors 3 in the semiconductor switch 1 are operated in a clocked mode of the semiconductor switch 1 and/or in a mode in the linear range as controllable resistors.

Figure 6:
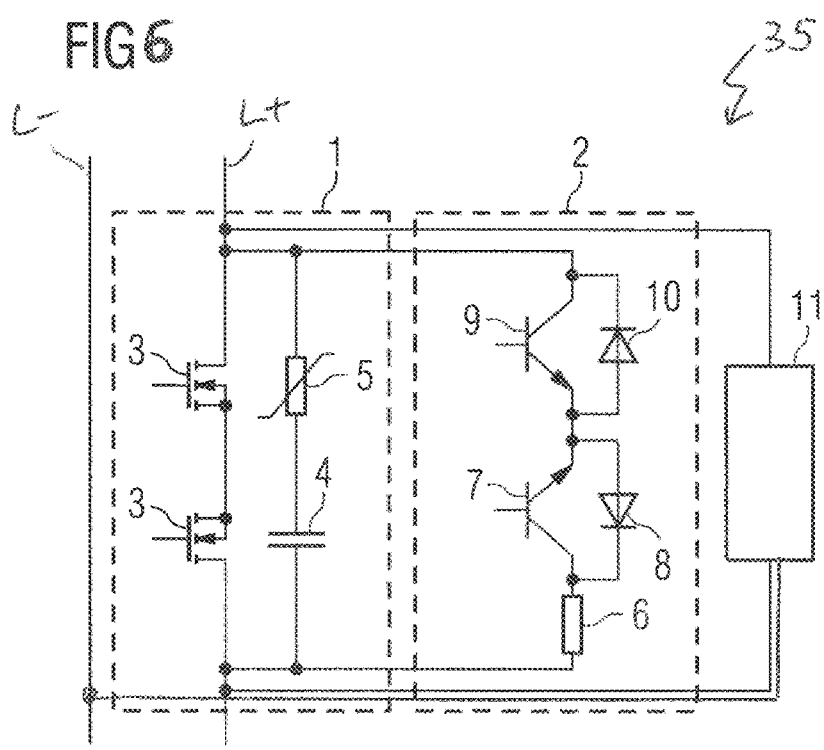
FIG. 6 shows a further example embodiment of a switching device.

FIG. 6 shows a further example embodiment of a voltage acquisition device 11 for the switching device 35 according to an embodiment of the invention. The voltage acquisition device 11 in this example taps the voltage difference in the first electrical conductor L+ at measurement points before and after the switching device 35, as well as the potential Φ2 of the second electrical conductor L−.

Figure 7:
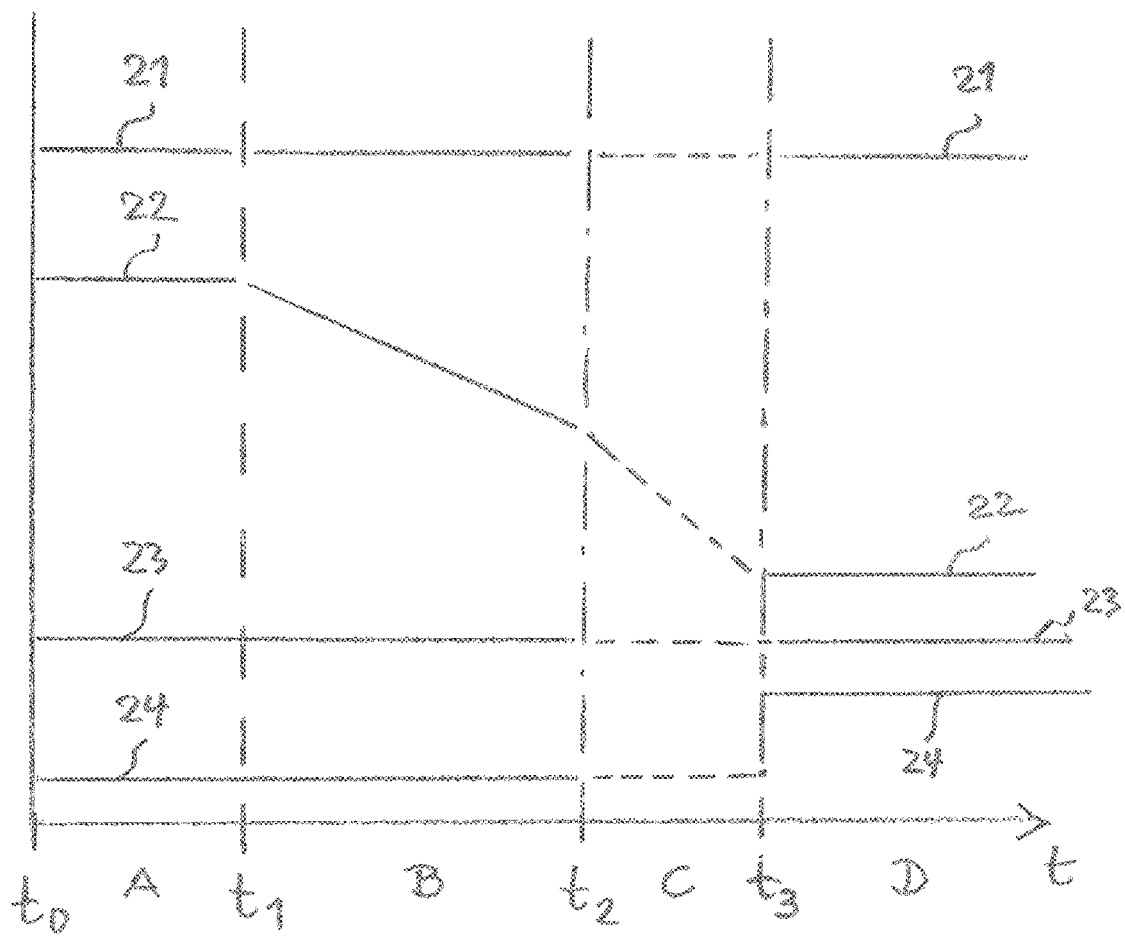
FIG. 7 shows a diagram of current and voltage values measured at the switching device against the time sequence of the method of an example embodiment.

FIG. 7 shows the current and voltage profiles of a power semiconductor with changes of state plotted against time t. Four measurement curves 21-24 are illustrated on the diagram. The measurement curve 21 characterizes the gate signal in the power semiconductor 3 in the main branch. The equalization current IA is illustrated by measurement curve 22. The measurement curve 23 shows the voltage across the switching device according to the invention. The DC network voltage UDC is illustrated in measurement curve 24. The illustration in FIG. 7 is also divided into regions A, B, C and D. The power semiconductor 3 is switched off in the region A, which starts at t0 and ends at t1. At this time the full voltage is dropped across the power semiconductor. In the region B, between t1 and t2, precharging via the precharging resistor until a threshold value is reached is illustrated. The region C between t2 and t3 shows the clocking of the power semiconductor in the main path down to a voltage difference of zero, or until the equalization current is smaller than a predefined reference value. The fact that the measurement curves are dotted is intended to indicate that the measurement curves in the region C are subject to very large excursions as a result of the clocked operation; the dotted line shows a type of average value. Subsequently, starting at t3 in region D, the switched-on power semiconductor is shown, wherein there is now no longer any voltage difference between the input and output.

Figure 8:
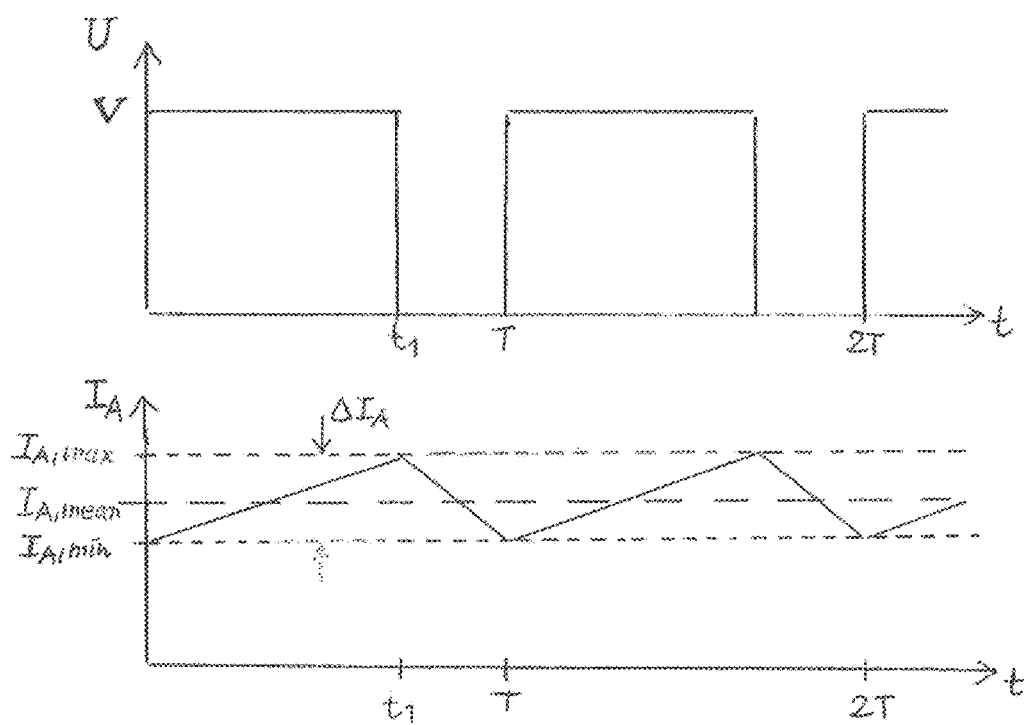
FIG. 8 shows a diagram for explaining the clocked operation of a semiconductor switch.

FIG. 8 shows a diagram for explaining the clocked operation of a semiconductor switch. The semiconductor, a transistor, for example, operates as a switch that is switched on and off at a high frequency, for example by way of a pulse-width modulated control voltage or by way of a two-point controller.

In the upper part of FIG. 8, a plot of a voltage U against time t shows that the semiconductor switch at which the voltage V is present is open during a partial time region from 0 up to t1 of a period duration T (switched-on time) and is closed in the remaining partial region from t1 up to T. The ratio between the switched-on time to the period duration (t1/T) is known as the duty cycle or duty ratio.

In the lower part of FIG. 8, a plot of an equalization current IA against time t shows that as a result of this alternating opening and closing of the semiconductor switch in the duty ratio, a triangular curve of the equalization current IA caused by the driving voltage V results, in which the equalization current IA moves back-and-forth between a minimum value IA, min and a maximum value IA, max with an amplitude ΔIA. A mean equalization current IA, mean results as the temporal mean value of the current, oscillating with a triangular waveform, and is plotted in the lower part of FIG. 8 as a dashed line.

Figure 9:
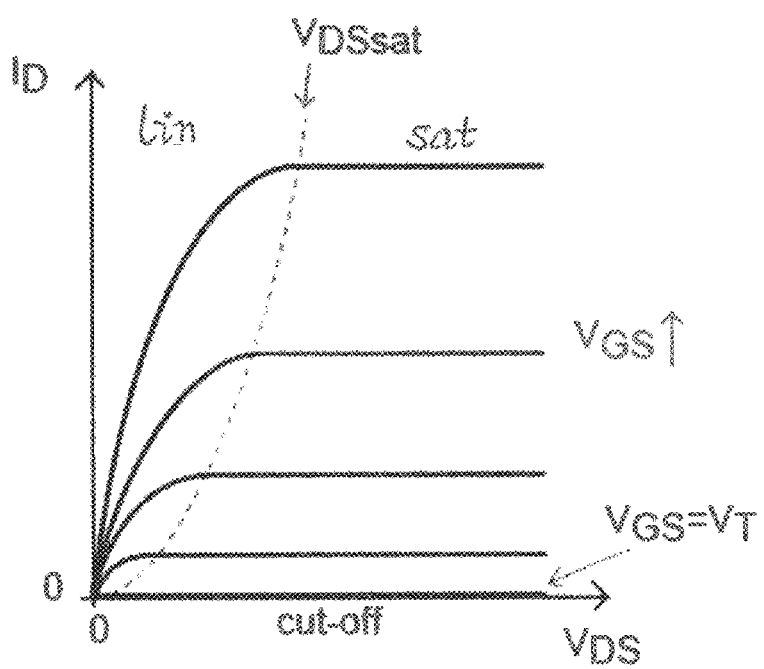
FIG. 9 shows a diagram for explaining the operation of a power semiconductor in the linear range.

FIG. 9 shows a diagram to explain the operation of a power semiconductor, in this case: a field effect transistor (FET) with drain, source and gate terminals, in the linear range. The drain current ID is plotted on the diagram against the drain-source voltage VDS, while various drain current curves are plotted on the diagram for different values of gate-source voltages VGS; in the event that the gate-source voltage VGS is equal to the threshold voltage VT, i.e. VGS=VT, the drain current curve runs along the x-axis. A linear (ohmic) operating range line of the semiconductor on the left of the diagram is distinguished from a saturated (active) operating range sat of the semiconductor on the right by a dashed parabolic line VDS sat. This representation of the relationships between the drain current ID and the drain-source voltage VDS depending on the gate-source voltage VGS is referred to as the output characteristic diagram of a MOSFET.

The invention claimed is:

1. A method for precharging a second network section with electrical energy from a first network section of a DC network, in an initial state, an initial voltage prevailing in the second network section being relatively lower than a DC voltage prevailing in the first network section, the method comprising:
   connecting, at a first point in time, the first network section and the second network section via a resistance current path including a precharging resistor; and
   connecting, at a subsequent second point in time when the voltage in the second network section lies between the initial voltage and the DC voltage, the first network section and the second network section via a semiconductor switch arranged parallel to the resistance current path and operated in a clocked mode.

2. The method of claim 1, further comprising:
   connecting the first network section and the second network section, via the semiconductor switch, as soon as the voltage in the second network section is between 60 and 90 percent of the DC voltage.

3. The method of claim 1, further comprising:
   connecting the first network section and the second network section, via the semiconductor switch, as soon as an equalization current, flowing through the resistance current path, is smaller than a threshold value.

4. A non-transitory computer program product, for precharging a second network section with electrical energy from a first network section of a DC network, storing computer code which, when executed in a controller of the DC network, is designed to carry out the method of claim 1.

5. A switching device for precharging a second network section with electrical energy from a first network section of a DC network, the switching device comprising:
   a resistance current path including a precharging resistor;
   a semiconductor switch, parallel to the resistance current path, configured to electrically connect the first network section and the second network section, the semiconductor switch including at least one power semiconductor operatable in a clocked mode; and
   a controller configured to control the at least one power semiconductor.

6. The switching device of claim 5, wherein the resistance current path includes a switch in series with the precharging resistor, and wherein the controller is configured to control the switch.

7. The switching device of claim 6, wherein the switch includes at least one power semiconductor.

8. A DC network including a first network section and a second network section, wherein, in an initial state, an initial voltage prevailing in the second network section is relatively lower than a DC voltage prevailing in the first network section, the DC network comprising:
   the switching device of claim 5 between the first network section and the second network section.

9. The DC network of claim 8, wherein the first network section and the second network section each include:
- a first conductor and a second conductor between which the voltage of the respective one of the first network section and the second network section is present,
- wherein the first network section and the second network section are permanently connected to one another via the second conductors, and are connectable to one another and disconnectable via the first conductors by a switching device.

10. The method of claim 1, wherein the first network section and the second network section are connected via the semiconductor switch as soon as either
- an equalization current, flowing through the resistance current path, is smaller than a threshold value, or
- the voltage in the second network section is between 60 and 90 percent of the DC voltage.

11. A non-transitory computer program product, for pre-charging a second network section with electrical energy from a first network section of a DC network, storing computer code which, when executed in a controller of the DC network, is designed to carry out the method of claim 10.

12. A DC network including a first network section and a second network section, wherein, in an initial state, an initial voltage prevailing in the second network section is relatively lower than a DC voltage prevailing in the first network section, the DC network comprising:
- the switching device of claim 6 between the first network section and the second network section.

13. The DC network of claim 12, wherein the first network section and the second network section each include:
- a first conductor and a second conductor between which the voltage of the respective one of the first network section and the second network section is present,
- wherein the first network section and the second network section are permanently connected to one another via the second conductors, and are connectable to one another and disconnectable via the first conductors by a switching device.

14. A DC network including a first network section and a second network section, wherein, in an initial state, an initial voltage prevailing in the second network section is relatively lower than a DC voltage prevailing in the first network section, the DC network comprising:
- the switching device of claim 7 between the first network section and the second network section.

15. The DC network of claim 14, wherein the first network section and the second network section each include:
- a first conductor and a second conductor between which the voltage of the respective one of the first network section and the second network section is present,
- wherein the first network section and the second network section are permanently connected to one another via the second conductors, and are connectable to one another and disconnectable via the first conductors by a switching device.

* * * * *